United States Patent [19]
Kato et al.

[11] 3,982,050
[45] Sept. 21, 1976

[54] METHOD FOR COATING INNER FACES OF METAL PIPES OF SMALL DIAMETER

[75] Inventors: Haruhiro Kato, Kawasaki; Tsunehiko Toyoda; Hiroyuki Tanabe, both of Yokohama, all of Japan

[73] Assignee: Dai Nippon Co., Ltd., Japan

[22] Filed: May 16, 1974

[21] Appl. No.: 470,670

[30] Foreign Application Priority Data
May 21, 1973 Japan.................................. 48-56631

[52] U.S. Cl.............................. 427/181; 118/317; 118/318; 118/DIG. 10; 427/182; 427/183; 427/195; 427/203; 427/231; 427/233; 427/238; 427/239
[51] Int. Cl.².................... B05D 7/22; B05D 1/24
[58] Field of Search................. 117/18, 21, DIG. 6, 117/95, 96, 97; 427/183, 182, 195, 203, 230, 231, 233, 236, 238; 118/317, 318

[56] References Cited
UNITED STATES PATENTS

| | | | |
|---|---|---|---|
| 3,016,875 | 1/1962 | Ballentine et al................. | 117/33 X |
| 3,028,251 | 4/1962 | Nagel................................ | 117/DIG. 6 |
| 3,074,808 | 1/1963 | Harrison .......................... | 117/21 X |
| 3,186,860 | 6/1965 | Jones ................................ | 117/21 X |
| 3,207,618 | 9/1965 | DeHart............................. | 117/21 X |
| 3,245,824 | 4/1966 | Treat et al. ...................... | 117/21;18 |
| 3,264,371 | 8/1966 | Gruber et al. .................... | 117/21 X |
| 3,338,863 | 8/1967 | Haag................................ | 117/21 X |
| 3,376,152 | 4/1968 | Okamoto et al................... | 17/21 X |
| 3,432,326 | 3/1969 | Lemelson......................... | 117/21 X |
| 3,484,276 | 12/1969 | Burggraff......................... | 117/21 X |
| 3,488,206 | 1/1970 | Munder et al. .................. | 117/21 X |
| 3,532,531 | 10/1970 | Stallard............................ | 117/21 X |
| 3,814,616 | 6/1974 | Kondo et al. .................... | 117/21 X |

Primary Examiner—Ronald H. Smith
Assistant Examiner—Shrive P. Beck

[57] ABSTRACT

This invention relates to a method for coating inner faces of metal pipes of a small diameter which comprises feeding a stream of a powdery resin at a rate of 2 to 10 m/sec into a metal pipe of a small diameter preheated at a temperature higher by 20° to 70°C. than the melting or softening point of said powdery resin so that the concentration of said powdery resin or a mixture of said powdery resin and a carrier is 5 to 40% by volume.

4 Claims, 4 Drawing Figures

METHOD FOR COATING INNER FACES OF METAL PIPES OF SMALL DIAMETER

BACKGROUND OF THE INVENTION

1. Field of the Invention

This invention relates to a method for coating inner faces of metal tubes or pipes (hereinafter referred to as "pipes") of a small diameter. More particularly, the invention relates to a method for forming a highly corrosion-resistant coating on the inner face of a long metal pipe of a small diameter, especially a diameter smaller than 2 or 3 inches, by uniformly coating the inner face of the pipe with powder of a synthetic resin with high efficiency.

2. Description of the Prior Art

Various methods for coating inner faces of metal pipes with powdery resins have heretofore been known in the art. For instance, there is known a method for coating inner faces of a pipe by inserting a long nozzle into the pipe, spraying a powdery resin from a nozzle tip while moving the nozzle from one end of the pipe to the other end, and thus forming a resin coating on the inner face of the heated pipe (see specifications of U.S. Pat. Nos. 3,016,875 and 3,245,824). The fatal defect of this method is that it is difficult to insert the nozzle into a pipe to be coated. The smaller is the inner diameter of the pipe or the longer is the pipe, the more difficult and troublesome is the operation of inserting the nozzle into the pipe. Accordingly, this method cannot be conveniently applied to a production line in which high speed operation is required.

Another known method comprises moving a vertical pipe partially heated by an induction heater or a ring-like gas burner in a fluidized bed while blowing up a powdery resin into the pipe or causing the powdery resin to flow downwardly in the pipe by the action of the fluidized bed, to thereby melt-coat the powdery resin on the inner face of the pipe and form a coating thereon (see specifications of U.S. Pat. No. 3,074,808 and Japanese Patent Publications Nos. 9947/60, 5536/61, 15080/63 and 23792/68).

There is also known a method comprising placing a preheated pipe vertically in a fluidized bed and blowing up or sucking a powdery resin into the pipe to thereby melt-coat the powdery resin on the inner face of the pipe and form a coating thereon (see specifications of U.S. Pat. Nos. 3,063,860 and 3,138,483 and Japanese Patent Publication No. 14340/68.

According to each of the foregoing methods, a powdery resin is sucked or compressed into a pipe from a fluidized bed. In this case, however, the pipe can be treated only in the vertical state because it is vertically connected to the fluidized bed. Treating or handling long pipes in the vertical state involves various difficulties when the operation is conducted on an industrial scale. Therefore, these methods are not suitable for mass production.

As another known method, there can be mentioned a method comprising feeding as a fluidizing gas a low temperature gas maintained below 0°F. into a fluidized bed, maintaining in vacuo the interior of a pipe preheated at a high temperature (350° to 600°F.), sucking a cooled powdery resin into the pipe from the fluidized bed and thus forming a resin coating on the inner face of the pipe (see the specification of U.S. Pat. No. 3,532,531). In this method, the entire system including the pipe to be coated must be kept in vacuo, and therefore, each joint portion must be kept air-tight. Further, since the fluidized gas is maintained below 0°F., condensation of water readily occurs in the apparatus and on the powdery resin, and therefore, interception of outer air and maintenance of air-tightness are very important in this method. However, various operational difficulties are involved if the operation is conducted on an industrial scale so that the foregoing conditions are satisfied. Moreover, the equipment cost is very high.

Some methods are known in the art, according to which a coating-forming powdery resin is passed through the interior of a metal pipe with a gas stream (air stream) and coating of the inner face of the metal pipe is accomplished by the heat retained by the preheated pipe or by using an induction heater.

For instance, the specification of Japanese Patent Publication No. 25152/65 discloses an apparatus in which a powdery thermoplastic resin is compressed or sucked together with air into a preheated pipe being rotated in an inclined manner to cause the resin powder to stick on the inner face of the pipe and excessive powder remaining in the pipe is blown away by blowing-in of compressed air. In the invention disclosed in this prior art reference, in order to obtain a uniform coating on the inner face of a pipe it is indispensable to rotate the pipe during feeding of the powdery resin. The reason is that since the concentration of the powder fed is low, not exceeding several grams per liter, the majority of the power flows along the lower face portion during passage through the interior of the pipe and if the pipe is not rotated, the thickness of the resin powder coated on the inner wall of the pipe differs considerably between the upper face portion and lower face portion.

A similar technique is disclosed in Japanese Patent Application Disclosure No. 17856/73. According to this method, a powdery resin in great excess of the amount necessary for coating is fed into a preheated metal pipe together with a gas and then only the gas is fed into the metal pipe, whereby a uniform resin coating is formed on the inner face of the metal pipe. More specifically, a powder in an amount 3 to 20 times as large as the amount to be applied as coating is fed together with a gas within a certain coating period and passed through the metal pipe. At this time, the powder concentration is lower than several grams per liter (more concretely, below 7.1 g/l). Also in this method rotation of the pipe is indispensable, and since the powder concentration is as low as mentioned above and the powder feed rate is relatively high, namely 12 to 30 m/sec., in order to coat the resin powder on the inner wall of the pipe with high efficiency, it is necessary to preheat a pipe to be coated to a temperature much higher than the melting point of the resin, and provision of an apparatus of large dimensions is necessary for attaining a high gas speed for carrying the resin powder. Still further, it takes as long as shout 20 seconds to complete coating of a pipe of 5.5 m standard length.

A similar method is known from Japanese Patent Application Disclosure No. 8789/72. In this method, a gas stream containing a resin powder and a gas free of a resin powder are circulated independently, and at the time of coating, the resin powder-containing gas stream is made to flow through the interior of a pipe to be coated, and heating and cooling of the pipe are controlled by an induction heater and a subsequent water cooler so that the resin powder melt-coats on the inner face of the pipe. Coincidentally with termination of coating of the inner face of the pipe, the powder-free gas stream is made to flow through the pipe by the switch-over of a change-over valve to blow away the remaining excessive powder from the interior of the pipe, and coating of the inner face of the pipe is thus completed. Also in this method, the powder concentration in the gas stream passing through the interior of the pipe at the time of coating is as low as several grams per liter, and therefore, it is indispensable to rotate the pipe to be coated or to provide a high speed gas stream, in order to obtain a uniform coating on the inner face of a pipe. This method is characterized by provision of an induction heater and a pipe-cooling device interlocked with the induction heater. In the induction heating system, however, the heating rate is limited mainly for economical reasons, and this method is defective in that in order to obtain a sufficient moving speed, for example, several tens of meters per minute, it is necessary to provide an expensive apparatus of large dimensions. Moreover, also in this method it takes as long as 30 to 60 seconds to complete coating of a pipe of 5.5 m standard length. Accordingly, it is apparent that the inner face coating method using an induction heating system is not suitable for coating long pipes.

As is apparent from the foregoing description, the each known methods has its defects and shortcomings, and none of them is suitable as an industrial system for mass production.

SUMMARY OF THE INVENTION

This invention relates to a method for coating inner faces of long metal pipes of a small diameter by feeding a high concentration resin powder together with air or an inert gas into a preheated metal pipe.

It is the primary object of this invention to provide a pipe-coating method in which the inner face of the pipe is uniformly coated within a very short time.

Another object of this invention is to provide a pipe-coating method in which no particular condition is set as regards retention of the pipe, namely it is quite unnecessary to rotate the pipe to be coated or maintain it in the vertical state throughout the coating operation.

Still another object of this invention is to provide a pipe-coating method in which the amount used of a powdery resin to be fed for coating is greatly reduced and a uniform coating is obtained in a very short time.

In accordance with the fundamental aspect of this invention, there is provided a method for coating inner faces of long metal pipes of a small diameter which comprises feeding a resin powder stream at a rate of 2 to 10 m/sec into a metal pipe of a small diameter preheated at a temperature higher by 20° to 70°C. than the melting or softening point of the resin powder and kept in the horizontal state, by suction, compression or like means so that the concentration of the resin powder or a mixture of the resin powder and a carrier is always kept at a level of 5 to 40% by volume in the interior of the metal pipe.

DESCRIPTION OF THE PREFERRED EMBODIMENTS

Figure 1:
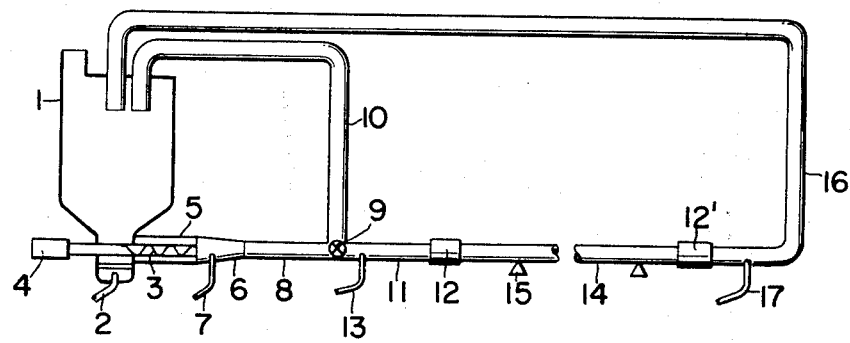
FIG. 1 is a view showing an outline of an apparatus to be used for practice of the method of this invention.

In the method of this invention, a metal pipe to be coated is first preheated. Preheating can be accomplished by utilizing air or the like, as described in detail hereinafter. A powdery resin is fluidized and pressed into the metal pipe together with air or an inert gas, and at this time the powdery resin concentration is kept at such a high level as 5 to 40% by volume (50 to 400 cc/l). The flow rate (feed rate) of the powdery resin is below 10 m/sec., preferably within a range of 2 to 7 m/sec.

The powdery resin is made to flow in the metal pipe to be coated from the inlet to the outlet thereof. The preheating temperature for the metal pipe is maintained at a level higher by 20° to 70°C. than the melting or softening point of the powdery resin used. The reason why inner face coating is sufficiently accomplished in this invention at a relatively low metal-preheating temperature as compared with known methods is that since the concentration of the resin powder made to flow in the pipe is very high, the efficiency of contact between the resin powder and the inner wall of the pipe is very high and since the flow rate of the resin powder is low, heat energy is transferred to the resin powder from the metal pipe with high efficiency.

The low preheating temperature results in another advantage in connection with the resin powder made to flow in the metal pipe. More specifically, only a part of the resin powder fed into the pipe for coating is fixed to the pipe wall and utilized for formation of a coating, and the remaining majority of the resin powder is passed through the interior of the pipe discharged outside the pipe. The so discharged resin powder is recovered and used again for coating. In this case, however, when the temperature inside the pipe is high, the resin undergoes such changes as deterioration and curing during the passage through the interior of the pipe and properties of the resin are drastically degraded when it is used repeatedly. In contrast, in this invention, since the metal pipe-preheating temperature is maintained at a low level, such undesired degradation is not brought about in the resin powder.

The feature of this invention of the preheating temperature being low brings about the foregoing practical advantages.

In this invention, a resin powder is fed at a high concentration into the so preheated metal pipe at such a low feed rate as 2 to 10 m/sec. This feature results in an advantage that the time required for completion of inner face coating is very short. More specifically, when the powdery resin is flown through the interior of a pipe at a high concentration and a low rate, the efficiency of absorption of heat energy from the pipe wall is heightened and therefore, it is made possible to reduce the preheating temperature and increase the rate of melt-coating of the resin on the pipe wall, with the result that the time required for coating the entire inner face of the pipe is much shortened.

More specifically, although it takes 20 to 60 seconds to complete coating of a tube of the standard length (5.5 m) in conventional methods, according to this invention it is possible to obtain a sufficient coating on the inner face of a standard length pipe within several seconds. By virtue of this feature, various advantages can be attained when the method of this invention is applied to mass production.

Another advantageous feature of this invention is that even a long pipe can be uniformly coated in the horizontal state without rotation of the pipe. Of course, also in this invention good results can be obtained when the pipe is rotated as in the conventional methods. The inner face coating of pipes is performed in the conventional methods predominantly by keeping them in the vertical state and if the pipes are kept in the horizontal state, rotation of the pipes is indispensable in the conventional methods. Obviously, various operational difficulties and troubles are involved in handling long pipes of a small diameter while keeping them in the vertical state, and even if coating is performed by rotating pipes while keeping them in the horizontal state, there is inevitably brought about a defect that provision of a particular rotation device is indispensable and the rotation operation involves special problems.

In the method of this invention where a resin powder is fed at a high concentration into a long pipe of a small diameter to form a coating on the inner face of the pipe, needless to say, the metal pipe can be coated while keeping it in the horizontal state even without rotation of the pipe. The resin powder made to flow in the interior of the pipe is made to flow not only along the lower face portion of the interior of the pipe but a powdery resin stream of a sufficient concentration has contact with the upper portion. Accordingly, in this invention it is quite unnecessary to particularly rotate a metal pipe to be coated, and a uniform coating can be formed throughout the inner face of the metal pipe with ease.

Metal pipes to be coated according to the method of this invention are not limited to straight pipes, and even in the case of bent pipes inner face coating can be sufficiently performed as in the case of straight pipes.

In the method of this invention, after the above-mentioned coating operation is completed in a short time, a stream of air or an inert gas is made to flow through the interior of the coated pipe to blow away the powdery resin not coated on the inner face of the pipe.

According to the method of this invention, double coating can be performed relatively easily by employing two different powdery resins. More specifically, a pair of feed devices of the same configuration differing only in the powdery resin feed portion are provided, and one powdery resin is fed from the first feed device and coated on the inner surface of a metal pipe and by the switch-over of a change-over valve the other powdery resin is fed from the second feed device to form a second coating layer. According to this embodiment, a primer coating and a top coat can easily be formed on the inner face of a metal pipe, and a more tough corrosion-resistant coating layer can be formed.

According to another embodiment of this invention, it is made possible to reduce greatly the amount fed of the powdery resin by feeding a mixture of the powdery resin and a carrier.

By the term "carrier" used herein is meant a substance which merely passes through the interior of a pipe to be coated without melting or substantial participation in the formation of the coatings. As discussed hereafter the carrier has the effect of dispersing and feeding a powdery resin as a coating-forming material into the interior of a pipe.

One embodiment of the method of this invention will now be described by reference to the accompanying drawings.

In FIG. 1, a resin powder to be used for coating is stored in a hopper 1, on the bottom portion of which a perforated plate is mounted, and low pressure air or inert gas is blown from a gas introduction inlet 2 disposed below the perforated plate, whereby the resin powder present in the bottom portion of the hopper is fluidized. A screw 3, rotated and driven by a variable motor 4, is provided to penetrate through the bottom portion of the hopper and the other end of the screw 3 is inserted in a screw guide 5. The outlet of the screw guide 5 is connected to a diameter-adjusting flange 6 provided with a feed gas introduction opening 7, and the diameter of the outlet side of the flange 6 is reduced to the required size and it is connected to a resin powder introduction pipe 8. The resin powder introduction pipe 8 forms a passage for introducing a stream of the fed resin powder into a pipe to be coated and the resin powder introduction pipe 8 is provided with a change-over valve 9. At the change-over valve 9, the pipe 8 is divided into a feed-back passage 10 for returning the powdery resin stream to the hopper 1 when a pipe is not coated and a passage 11 for introducing the powdery resin stream into a pipe to be coated. The end portion of the passage 11 is provided with a pipe joint 12 and an air-blowing inlet 13 is disposed in the midway of the passage 11. A preheated pipe 14 to be coated is supported by a supporting stand 15 and connected to the joint 12, and the other end of the pipe 14 is connected to a similar joint 12', to form a part of the circulation passage for the powdery resin. On the other side of the pipe joint 12' there is formed a powdery resin feed-back portion 16, and a cooling gas introduction opening 17 is disposed in the vicinity of the outlet of the pipe joint 12', whereby there is formed a feed-back passage for returning the powdery resin which has not been coated on the pipe but passed therethrough, to the hopper 1 while cooling the resin.

Figure 2:
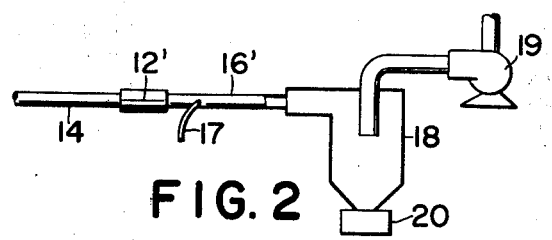
FIG. 2 is a view showing an embodiment of a powdery resin recovery device provided in the apparatus of FIG. 1.

FIG. 2 illustrates a device for recovering powdery resin not used in coating coming from the interior of a pipe to be coated without returning it directly to the hopper 1, and the portion downstream of the outlet of the joint 12' is shown in FIG. 2 and this portion forms a resin recovery passage 16'. A cooling gas introduction opening 17 is disposed in the midway of the recovery passage 16', and the end portion of the recovery passage 16' is connected to a cyclone 18. The powdery resin introduced into the cyclone 18 by a gas-absorbing device 19 is recovered into a cyclone hopper 20.

Figure 3:
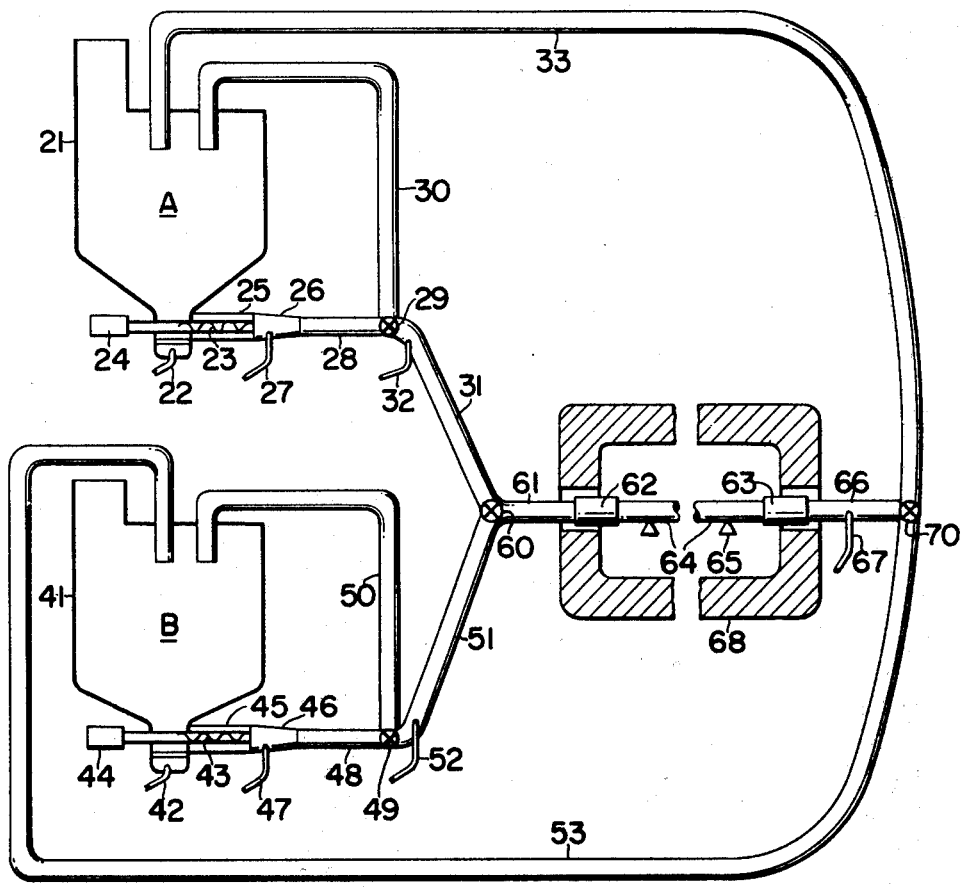
FIG. 3 is a view showing an outline of an apparatus for conducting double coating by employing a single resin powder or two different resin powders according to the method of this invention.

FIG. 3 illustrates an apparatus for conducting the double coating in a continuous manner by employing two different powdery resins. In FIG. 3, A indicates a system for one powdery resin (A) and B designates a system for the other powdery resin (B). For instance, the system A is for a powdery resin to be used for formation of a primer coating, and the system B is for a powdery resin to be used for formation of a top coat.

In FIG. 3, reference numerals 21 and 41 stand for hoppers for storing respective powdery resins to be used for coating, and 22 and 42 indicate openings for introduction of air or an inert gas. Screws 23 and 43 are rotated and driven by variable motors 24 and 44, respectively. Reference numerals 25 and 45 indicate screw guides, 27 and 47 stand for openings for introduction of a carrier gas and 26 and 46 stand for diameter adjusting flanges. Reference numerals 28 and 48 are pipes for introducing a stream of the fed resin into a pipe to be coated, and 29 and 49 are change-over valves, from which there are formed feed-back passages 30 and 50 on one side and passages 31 and 51 for introduction of the resin powder in a pipe to be coated on the other side. The foregoing members have the same functions as those of the corresponding members shown in FIG. 1.

Air-blowing inlets 32 and 52 are disposed in the midway of the passages 31 and 51, respectively, and these passages 31 and 51 are connected to a valve 60 for change-over of the systems A and B. Passages 33 and 53 for returning the powdery resins coming from the pipe to be coated to respective hoppers 21 and 41 are extended from a change-over valve 70 disposed on the outlet side of the coating zone. The change-over valve 60 disposed on the inlet side of the coating zone has a portion 61 for connecting a pipe to be coated and a pipe joint 62 is mounted on the end of the portion 61. A pipe 64 to be coated is connected to the joint 62 and supported by a pipe-supporting stand 65, and is connected to an outlet side pipe joint 63. Downstream of the outlet side of pipe joint 63 there is formed a powdery resin feed-back passage 66 and it is provided with a cooling gas introduction inlet 67 in the vicinity of the joint 63. The resin powder which has not been fixed to the pipe wall but passed through the interior thereof is cooled, introduced into the return passage 33 or 53 by the change-over valve 70 and returned to the hopper 21 or 41. A member 68 constituting the coating zone is a heating furnace for preheating or post-heating a pipe to be coated or a coated pipe, and this heating furnace is provided with an infrared heater, a hot air feeding heater, an electric heater or other suitable heating means.

The resin concentration in the powdery resin stream in each portion of the apparatus shown in FIGS. 1 and 3 will now be described.

The concentration of the powdery resin fluidized in the bottom portion of the hopper 1 is 20 to 50% by volume (200 to 500 cc/l), and the resin stream is forwarded by means of the screw 3 and is diluted with a carrier gas introduced from the inlet 7. When the resin stream is introduced into a metal pipe 14 to be coated, the powdery resin concentration is 5 to 40% by volume (50 to 400 cc/l). At this concentration, the amount of the powdery resin applied to the inner face of the pipe is as small as negligible, and the concentration hardly differs between the inlet side and outlet side of the pipe 14. Accordingly, during the coating operation the powdery resin is fluidized at the substantially same concentration at all points throughout the interior of the pipe 14 to be coated.

Figure 4:
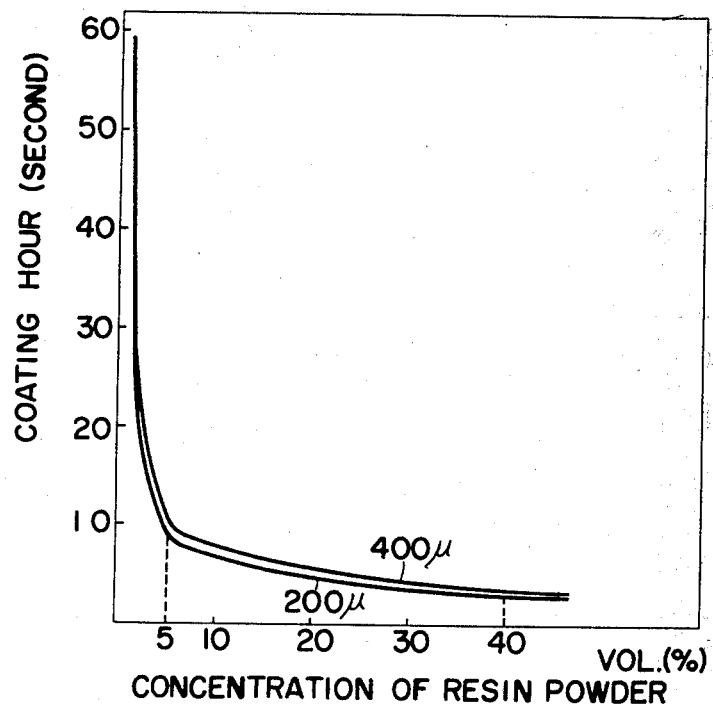
FIG. 4 is a graph showing the relation between the coating time and the resin powder concentration.

FIG. 4 illustrates a graph illustrating the relation between the coating time (in seconds) required for obtaining a prescribed thickness (200µ or 400µ) and the concentration (% by volume) of the powdery resin transported through the interior of a pipe to be coated.

Data shown in this graph were obtained by conducting the coating operation under the following conditions:

Resin: epoxy type powdery resin
Temperature of pipe to be coated: 120°C.
Length of pipe: 5500 mm
Flow rate of powdery resin: 4 m/sec.

From the graph shown in FIG. 4 it will readily be understood that when the powdery resin concentration is maintained at a level of 5 to 40% by volume, the prescribed coating thickness can be obtained in the shortest time.

More specifically, when the powdery resin concentration is lower, there is observed a tendency for a longer time to be required for coating one pipe sufficiently. In general, the coating formed on the inner surface of a metal pipe should have a thickness of at least 200µ. In case the resin concentration is lower than 1% by volume, it takes more than about 20 seconds to obtain a uniform coating of such sufficient thickness.

In mass production on an industrial scale, it is desired that the time required for completion of coating of a metal pipe of the standard length be within about 10 seconds. From FIG. 4, it is apparent that in order to obtain a coating of a practical thickness of 200µ to 400µ within 10 seconds, the powdery resin concentration should be at least 5% by volume.

If the powdery resin concentration is not lower than 5% by volume, a higher concentration results in shortening of the coating time, but from the practical viewpoint, a resin concentration need not be made higher than 40% by volume. In other words, even if the concentration is heightened beyond 40% by volume, no particular effect of shortening the coating time can be expected. Further, in view of the fluidization of the powdery resin, the upper limit of the powdery resin concentration is 40% by volume, and at a higher concentration the fluidization of the powdery resin by the gas current is almost impossible.

In this invention, a pipe to be coated is preheated at a temperature higher by 20° to 70°C. than the melting or softening point of a powdery resin fed. The reason is that if the difference between the preheating temperature and the melting or softening point of the powdery resin is smaller than 20°C., the powdery resin is not sufficiently molten of softened and it does not adhere to the inner wall of the pipe. If the above temperature difference exceeds 70°C., since the transportation rate of the powdery resin of a high concentration is low in this invention, the resin adheres to the inner wall of the pipe in too great a thickness, and in some cases the thickness reaches more than 2000µ and clogging of the powder occurs in the interior of the pipe.

In this invention, the rate of transportation of the powdery resin of a high concentration is kept within a range of from 2 to 10 m/sec. At a rate lower than 2 m/sec, the coating thickness becomes too high, and in some cases the thickness exceeds 2000µ and such undesirable phenomena as clogging of the powder are easily caused to occur. In case the resin transportation rate is higher than 10 m/sec, there is brought about the defect that the resin powder does not stick uniformly on the inner wall of the pipe.

In this invention, the powdery resin has an average particle size of several microns to 100µ, preferably 5 to 70µ.

In this invention, any of thermosetting and thermoplastic resins ordinarily used in powder coating can be used. For example, there are employed epoxy resins, polyester resins, acrylic resins, vinyl resins, polyamide resins, cellulose resins, polyolefin resins, fluorine resins, chlorinated polyether resins and the like. Mixtures of two or more of these resins can also be used.

It is possible to knead and incorporate into these resins additives customarily used in this field, for example, organic pigments, inorganic pigments, flowability-adjusting agents and curing agents.

Resins that can be used in this invention will now be described more detailedly.

The epoxy resin is an ordinarily thermosetting resin having an oxirane ring in the molecular structure. In other words, it is a resin of the glycidyl polyether type prepared from epichlorohydrin and bis-phenol A. Such epoxy resins having a molecular weight of about 1500 to about 4000 and a melting point of about 65° to about 160°C. are preferably employed. In general, compositions comprising one or more of these epoxy resins and a curing agent such as dicyandiamide, a $BF_3$/amine complex, an acid hydride, e.g., phthalic anhydride and maleic anhydride, and a dibasic acid, e.g., adipic acid and sebacic acid, are employed.

The acrylic resin is a copolymer prepolymer formed from two or more of such acrylic monomers as acrylic acid, methacrylic acid, $\beta$-hydroxyethyl acrylate, $\beta$-hydroxyethyl methacrylate, glycidyl methacrylate, methyl methacrylate, ethyl methacrylate and n-butyl methacrylate, which has a molecular weight of about 2000 to about 5000 and a melting point of about 70° to about 100°C. In general, such acrylic resin is incorporated with a cross-linking agent such as a polybasic acid, e.g., adipic acid, an acid anhydride, e.g., phthalic anhydride, a melamine resin, e.g., hexamethoxymethylol melamine, a blocked isocyanate formed by blocking the isocyanate group of toluene diisocyanate with phenol or the like, and a diepoxy compound.

The polyester resin is a resin composed mainly of an esterification product obtained by condensation of a polybasic acid and a polyhydric alcohol, and it is divided into the thermosetting type (unsaturated polyester resin) and the thermoplastic type (saturated polyester resin). A typical instance of the thermoplastic polyester is polyethylene terephthalate obtained by condensation of ethylene glycol and terephthalic acid. Thermoplastic polyesters formed by replacing all or a part of terephthalic acid by isophthalic acid and all or a part of ethylene glycol by such a polyhydric alcohol as glycerin and pentaerythritol can also be employed. A powdery thermoplastic polyester resin having a softening point of about 120° to about 180°C. is effectively employed in this invention. As a powdery thermosetting polyester resin preferably used in this invention, there can be mentioned a resinous composition obtained by melt-mixing a saturated polyester resin containing a large amount of hydroxyl groups in the molecule which is synthesized by using a raw material formed by incorporating a polyhydric alcohol such as glycerin or pentaerythritol into the above-mentioned raw material for the thermroplastic polyester, with a cross-linking agent such as a blocked isocyanate compound (for example, a compound formed by blocking the isocyanate group with phenol, cresol or the like). In short, a resin of the type in which cross-linking is caused to occur by reaction between the hydroxyl and isocyanate groups when baking is conducted at a high temperature at the time of forming a coating. It is preferred that such polyester resin have a melting point of about 70° to about 120°C. as measured as the prepolymer. In addition to the foregoing blocked polyisocyanate, hexamethoxymethylol melamine and a polybasic carboxylic anhydride such as phthalic anhydride can be used as the cross-linking agent for the polyester resin.

As the vinyl resin, there can be mentioned, for example, polyvinyl chloride, vinyl chloride-vinyl acetate copolymers and vinyl chloride-vinylidene chloride copolymers. A powder of such resin having a molecular weight of about 50,000 to about 100,000 and a melting point of about 135° to about 150°C. is preferably used in this invention.

As the polyamide resin, there can be mentioned, for example, a macromolecular resin formed by condensation of a dicarboxylic acid and a diamine and a macromolecular resin formed by intermolecular self-condensation of $\epsilon$-aminocaproic acid. A typical instance of such macromolecular condensation resin is nylon formed by condensation of adipic acid and hexamethylene diamine. It is preferred that a powdery resin of this type having a molecular weight of about 8000 to about 20,000 and a melting point of about 150° to about 250°C. be used.

As the cellulose resin to be used in this invention, there can be mentioned cellulose acetate butyrate, and it is preferred that the resin have a melting point of about 160° to about 190°C.

As the polyolefin resin there can be mentioned polyethylene, polypropylene and the like, and it is preferred to employ a polyolefin resin having a molecular weight of about 8000 to about 80,000 and a softening point of about 100° to about 180°C.

By the "carrier" used in this invention in combination with the powdery resin is meant a substance that does not melt-coat to the inner face of a pipe but merely passes through the interior thereof and has a function similar to that of an extender. The carrier will now be described.

The carrier to be used in this invention is a granular substance having a melting or softening point equal to or higher than that of the powdery resin and an average particle size of $150\mu$ to 5 mm, preferably $200\mu$ to 2 mm. Examples of such granular substance include polystyrene beads, polyethylene resin particles, polyurethane resin particles, foamed polyurethane resin particles, microballoons and microcapsules such as carbon ballons, alumina bubbles, silica balloons, glass microballoons and phenol microballoons, porous particles such as zeolite, glass beads, metal particles, and the like. It is preferred that the carrier have a specific gravity lower than 1 and has a particle size 5 to 100 times the particle size of the powdery resin used.

A carrier having the same chemical composition as that of the powdery resin used and having a melting or softening point substantially equal to that of the powdery resin used can also be used in this invention. In this case, the differences of heat capacity and kinetic energy owing to the difference of the particle size is an important factor for attaining the feature that the carrier does not melt-coat to the inner face of a metal pipe but only the powdery resin melt-coats to the inner wall. Therefore, in such case, it is indispensable that the carrier have a particle size at least 5 times the particle size of the powdery resin.

In the embodiment of this invention using such carrier, it is desired that the mixing weight ratio of the powdery resin and carrier be within a range of from 20:80 to 90:10. In case the mixing ratio of the carrier exceeds 80% by weight based on the sum of the powdery resin and carrier, the amount of the powdery resin for formation of a coating is reduced and it is difficult to obtain a coating having a practical thickness.

In the method of this invention, as is apparent from the foregoing description, the time required for formation of a coating having a generally desired thickness (200 to 400μ) is greatly shortened and is as short as less than 10 seconds. In short, the coating time can be reduced to ½ to 1/6 of the coating time required in the conventional methods.

This invention will now be described more detailedly by reference to the following Examples.

EXAMPLE 1

Mono Powder Pump P 12 (trademark for a powder feed pump having a snake type screw, manufactured by Mono Pumps Ltd., Great Britain) was used for feeding a powdery resin, and the following concentration of the powdery resin in a pipe to be coated was obtained by adjusting the rotation rate of the motor.

A steel pipe SGP 15A (specified by JIS) having a length of 5500 mm was washed with hydrochloric acid and was subjected to the surface treatment with zinc phosphate. This steel pipe was used as a pipe to be coated. A powdery epoxy resin passable through a 150-mesh sieve and having a melting point of 80° to 90°C. was used as a powdery resin for formation of a coating. The pipe to be coated was fixed at the position 14 in FIG. 1 and it was kept air-tight by Teflon joints 12 and 12'. The inner face of the pipe was coated under the following conditions:

Powder concentration in fluidized bed in hopper: 46% by volume
Powder concentration in pipe to be coated: 37.5% by volume
Pipe preheating temperature: 120°C.
Powder feed rate: 3 m/sec.
Coating time: 5 seconds
Air-blowing rate in pipe after coating operation: 10 m/sec.

The so inner face-coated pipe was placed in a heating furnace and was heated at 220°C. for 20 minutes to completely cure the coating formed on the inner face of the pipe. The so formed inner face coating was an epoxy resin coating having an uniform thickness of 350 ± 30μ and a smooth surface.

EXAMPLE 2

A steel pipe SGP 20A (specified by JIS) having a length of 5500 mm was washed with hydrochloric acid and subjected to the surface treatment with zinc phosphate. This pipe was used as a pipe to be coated.

The same pump as used in Example 1 was employed as the powder feed apparatus, and a powdery epoxy resin passable through a 150-mesh sieve and having a melting point of 80° to 90°C. was used as a powdery resin for formation of a coating. The pipe to be coated was fixed at the position 14 in FIG. 1 and was kept air-tight by Teflon joints 12 and 12'. The inner face coating was conducted under the following conditions:

Powder concentration in fluidized bed in hopper: 46% by volume
Powder concentration in pipe to be coated: 20.6% by volume
Pipe preheating temperature: 120°C.
Powder feed rate: 4 m/sec.
Coating time: 6 seconds
Air-blowing rate in pipe after coating operation: 10 m/sec.

The so inner face-coated pipe was placed in a heating furnace and was heated at 220°C. for 20 seconds, to completely cure the coating formed on the inner face of the pipe. The so formed inner face coating was an epoxy resin coating having a uniform thickness of 300 ± 30μ and a smooth surface.

EXAMPLE 3

A steel pipe SGP 15A (specified by JIS) was washed with hydrochloric acid and subjected to the surface treatment with zinc phosphate, and this pipe was used as a pipe to be coated. A powdery polyethylene resin passable through a 150-mesh sieve and having a softening point of 120° to 125°C. was used as a powdery resin for formation of a coating. The pipe to be coated was fixed at the position 14 in FIG. 1 and kept air-tight by Teflon joints 12 and 12'. The same pump as used in Example 1 was employed as a powdery resin feed apparatus. The inner face coating was conducted under the following conditions:

Powder concentration in fluidized bed in hopper: 35.8% by volume
Powder concentration in pipe to be coated: 28.0% by volume
Pipe preheating temperature: 150°C.
Powder feed rate: 4 m/sec.
Coating time: 7 seconds
Air-blowing rate in pipe after coating operation: 7 seconds The so inner face-coated pipe was placed in a heating furnace and heated at 200°C. for 20 minutes to completely cure the coating formed on the inner face of the pipe. The so obtained inner face coating was a polyethylene coating having a uniform thickness of 300 ± 30μ and a smooth surface.

EXAMPLE 4

The same pump as used in Example 1 was employed as a powdery resin feed apparatus, and the powdery resin rate was so controlled by adjusting the rotation number of the motor that the following powder concentration was obtained in a pipe to be coated.

A steel pipe SGP 20A (specified by JIS) was washed with hydrochloric acid and subjected to the surface treatment with zinc phosphate, and this pipe was used as a pipe to be coated. A powdery polyethylene resin passable through a 150-mesh sieve and a softening point of 120° to 125°C. was used as a powdery resin for formation of a coating. The pipe to be coated was fixed at the position 14 in FIG. 1 and was kept air-tight by Teflon joints 12 and 12'. The inner face coating was conducted under the following conditions:

Powder concentration in fluidized bed in hopper: 35.8% by volume
Powder concentration in pipe to be coated: 10.5% by volume
Pipe preheating temperature: 170°C.
Powder feed rate: 5 m/sec.
Coating time: 5 seconds
Air-blowing rate in pipe after coating operation: 10 m/sec.

The so inner face-coated pipe was placed in a heating furnace and heated at 200°C. for 20 minutes. The so obtained inner coating was a polyethylene resin coating having a uniform thickness of 300 ± 30μ and a smooth surface.

EXAMPLE 5

A steel pipe SGP 15A (specified by JIS) was washed with hydrochloric acid and subjected to the surface treatment with zinc phosphate. This pipe was used as a pipe to be coated.

A polyethylene resin having a particle size not exceeding 43μ and a softening point of 120° to 125°C. was used as a powdery resin for formation of a coating. A grey-colored polyethylene resin having the same composition and softening point as those of the above polyethylene resin and having a particle size exceeding 221μ was used as a carrier. 20 parts by weight of the powdery resin for coating was mixed with 80 parts by weight of the carrier, and the mixture was fed by means of the same pump as used in Example 1 and the inner face of a preheated pipe kept in the horizontal state was coated under the following conditions:

Concentration of mixture of powdery resin and carrier in pipe to be coated: 25% by volume
Pipe preheating temperature: 140°C.
Mixture feed rate: 7 m/sec.
Coating time: 7 seconds
Air-blowing rate in pipe after coating operation: 10 m/sec.

The so inner face-coated pipe was placed in a heating furnace and heated at 200°C. for 20 minutes to completely cure the coating formed on the inner face of the pipe. The resulting coating was transparent and have a uniform thickness of 200 ± 30μ.

As is seen from the foregoing results, the carrier particles did not at all melt-adhere to the inner face but only the clear powdery resin selectively melt-adhered to the inner face of the pipe. Further, a uniform coating could be obtained in a short time, though the amount fed of the powdery resin was very small.

EXAMPLE 6

50 parts by weight of the same powdery resin of a particle size less than 43μ as used in Example 1 was mixed with 50 parts by weight of a carbon balloon of a particle size of 250μ (manufactured and sold under the tradename "Kurekasphere" by Kureha Kagaku), and by employing the mixture the inner face coating was conducted in the same manner as in Example 5. The resulting coating was transparent and had a uniform thickness of about 200μ.

EXAMPLE 7

By employing the same pump as used in Example 1, a mixture composed of 80 parts by weight of a powdery epoxy resin having an average particle size of 30μ and a melting point of 80° to 90°C. and 20 parts by weight of the same carrier as used in Example 5 was fed and coated in the same manner as in the preceding Examples under the following conditions:

Mixture concentration in pipe to be coated: 20.6% by volume
Pipe preheating temperature: 120°C.
Mixture feed rate: 4 m/sec.
Coating time: 6 seconds
Air-blowing rate in pipe after coating operation: 10 m/sec.

The so inner face-coated pipe was placed in a heating furnace and heated at 220°C. for 20 minutes to obtain an inner face coating having a uniform thickness of 250 ± 30μ and a smooth surface.

EXAMPLE 8

By employing the same pump as used in Example 1, a mixture composed of 60 parts by weight of a powdery polyethylene resin having an average particle size of 40μ and a softening point of 120° to 125°C. and 40 parts by weight of hollow glass beads having a particle size of about 300μ was fed and coated in the same manner as in preceding Examples under the following conditions:

Mixture concentration in pipe to be coated: 30% by volume
Pipe preheating temperature: 140°C.
Mixture feed rate: 7 m/sec.
Coating time: 7 seconds
Air-blowing rate in pipe after coating operation: 10 m/sec.

The so inner face-coated pipe was heated at 200°C. for 20 minutes to obtain a smooth coating having a uniform thickness of 200 ± 30μ.

EXAMPLE 9

A steel pipe 50A (specified by JIS) having a length of 2000 mm was subjected to the surface treatment with zinc phosphate, and this pipe was used as a pipe to be coated. A polyethylene resin having an average particle size of 50μ and a softening point of 120° to 125°C. was used as a powdery resin for formation of a coating and glass beads having a particle size of about 500μ were used as a carrier. A mixture composed of 80 parts by weight of the powdery resin and 20 parts by weight of the carrier was passed through the interior of the pipe kept in the vertical state to effect coating. The coating conditions were the same as those adopted in Example 8.

The so inner face-coated pipe was heated at 200°C. for 20 minutes to obtain a pipe having a smooth inner coating having a uniform thickness of 180 ± 30μ.

EXAMPLE 10

A steel pipe SGP 25A (specified by JIS) having a length of 5500 mm was washed with hydrochloric acid and subjected to the surface treatment with zinc phosphate, and this pipe was used as a pipe to be coated. The same powder feed apparatus as used in Example 1 was employed, and a thermosetting polyester resin passable through a 150-mesh sieve and a softening point of 70° to 80°C. was used as a powdery resin for formation of an inner face coating. The inner face coating was conducted under the following conditions:

Powder concentration is fluidized bed in hopper: 40% by volume
Powder concentration in pipe to be coated: 20% by volume
Pipe preheating temperature: 120°C.
Powder feed rate: 3.8 m/sec.
Coating time: 5 seconds
Air-blowing rate in pipe after coating operation: 10 m/sec.

The so inner face-coated pipe was placed in a heating furnace and heated at 200°C. for 30 minutes to completely cure the inner face coating. The resulting inner face coating was a thermally set polyester resin coating having a relatively uniform thickness of 300±30μ and a smooth surface.

EXAMPLE 11

A steel pipe SGP 20A (specified by JIS) was washed with hydrochloric acid and subjected to the surface treatment with zinc phosphate, and this pipe was used as a pipe to be coated. The same powder feed apparatus as used in Example 1 was employed. A thermoplastic polyester resin passable through a 150-mesh sieve and a softening point of 120° to 130°C. was employed as a powdery resin for formation of a coating. The inner face coating was conducted under the following conditions:

Powder concentration in fluidized bed in hopper: 40% by volume
Powder concentration in pipe to be coated: 18% by volume
Pipe preheating temperature: 150°C.
Powder feed rate: 5.7 m/sec.
Coating time: 7 seconds
Air-blowing rate in pipe after coating operation: 10 m/sec.

The so inner face-coated pipe was placed in a heating furnace and heated at 230°C. for 10 minutes. The so obtained inner face coating was a thermoplastic polyester resin coating having a relatively uniform thickness of $280 \pm 30\mu$ and a smooth surface.

EXAMPLE 12

In this Example, double coating with two different resins was conducted by employing the apparatus shown in FIG. 3. More specifically, a tough corrosion-resistant coating was formed by using an epoxy type powdery resin as a primer coating resin and a polyamide type powdery resin as a top coat resin.

A steel pipe SGP 20A (specified by JIS) having a length of 5500 mm was washed with hydrochloric acid and subjected to the surface treatment with zinc phosphate, and this pipe was used as a pipe to be coated. The powdery resin was fed by a powder feed device shown in FIG. 3. The pipe to be coated was fixed at the position 64 in FIG. 3 by means of connecting joints 62 and 63 composed of Teflon.

An epoxy type powdery resin passable through a 200-mesh sieve and having a melting point of 80° to 90°C. was fed as a primer coating-forming resin in the hopper 21, and fluidizing air was blown into the hopper from the inlet 22 to form a fluidized bed of the epoxy type powdery resin in the bottom portion of the hopper. Then, the motor 24 was rotated and by rotation of the snake type screw 23 the resin powder was forwarded, and air was blown in from the carrier gas introduction inlet 27 to transport the resin powder. A cock 29 was opened in the direction 31 only when the epoxy resin was fed into the pipe 64 to be coated (only at the time of coating), and in the ordinary state the cock 29 was opened in the direction 30 to form a passage for returning the resin powder to the hopper 21. When change-over cocks 60 and 70 were opened in the direction of the system A, the powdery resin fed through 31 was passed through 61 and the pipe 64 to be coated, and was returned to the hopper 21 through the return passage 33. The pipe 64 to be coated was preheated at a prescribed temperature by means of a heating furnace 68. While the powdery resin was being passed through the pipe 64, a cooling gas maintained below 0°C. was blown in from a cooling gas inlet 67. When the valve 29 was changed over after completion of the coating operation, high speed air was blown in from a blow gas inlet 32 to return the excessive powdery resin left in the passage to the hopper 21. By the above operation, a primer coating of the epoxy resin was formed on the inner face of the pipe 64. The coating conditions adopted are as follows:

Powder concentration in fluidized bed in hopper (A): 30% by volume
Powder concentration in pipe to be coated : 15% by volume
Pipe preheating temperature: 110°C.
Powder feed rate: 5 m/sec.
Coating time: 3 seconds
Air-blowing rate in pipe after coating operation: 10 m/sec.

The so epoxy resin inner face-coated pipe was then subjected to the polyamide resin top coat-forming operation in the following manner.

The epoxy resin inner face-coated pipe was kept at the above position and its temperature was elevated to 180°C. over a period of 5 minutes, which temperature was maintained during the coating operation. The cocks 60 and 70 were changed over to feed the resin powder in the direction of the system B, namely to feed the powdery resin from member 41, pass it through members 45, 46, 48, 49, 51, 60, 61, 62, 64, 63, 66, 70 and 53, and return it to the member 41.

A polyamide resin passable through a 150-mesh sieve and having a softening point of 150° to 160°C., which had been stored in the hopper 41, was circulated through a passage formed by members 41, 45, 46, 48, 49 and 50 of the system B as in the case of the above epoxy resin, and only when the resin powder was fed to the pipe to be coated, the cock 49 was changed over to feed the powdery resin in the direction 51, whereby the fluidized powdery resin was passed through the change-over valve 60, the pipe 64 to be coated and the outlet side change-over cock 70 and was returned to the hopper 41 through the return passage 53. On termination of the coating operation, the cock 49 was changed over to feed the powdery resin in the direction 50 again.

By the above operation, a top coat of the polyamide resin was formed on the epoxy resin primer coating. The coating conditions adopted are as follows:

Powder concentration in fluidized bed in hopper (B): 42% by volume
Powder concentration in pipe to be coated: 20% by volume
Pipe preheating temperature: 180°C.
Powder feed rate: 3 m/sec.
Coating time: 6 seconds
Air-blowing rate in pipe after coating operation: 10 m/sec.

The so inner face-coated pipe was heated at 230°C. for 10 minutes in a heating furnace to completely cure the inner face coating. The resulting coating is a relative uniform two-layer coating having a smooth surface and composed of an epoxy resin primer coating of a thickness of $150 \pm 30\mu$ and a polyamide resin top coat layer of a thickness of $230 \pm 30\mu$.

EXAMPLE 13

A high density polyethylene powder having an average particle size of $10\mu$ and a softening point of 120° to 125°C. was used as a powdery resin for formation of a coating and hollow glass beads having a particle size of 0.8 to 1.0 mm and a specific gravity of 0.8 were used as a carrier. A mixture composed of 40 parts by weight of the powdery resin and 60 parts by weight of the hollow glass beads was fed to a hopper to coat the inner face of a steel pipe having a length of 5500 mm. The coating operation was conducted in the same manner as in Example 3. Thus was obtained an inner coating having a uniform thickness and a smooth surface.

COMPARATIVE EXAMPLE

A steel pipe SGP 20A (specified by JIS) was washed with hydrochloric acid and subjected to the surface treatment with zinc phosphate, and this pipe was used as a pipe to be coated. An epoxy type powdery resin passable through a 150-mesh sieve and having a melting point of 80° to 90°C. was used as a powdery resin for formation of a coating, and the inner coating was carried out by empolying the same apparatus as used in Example 1. When it was intended to reduce the powder concentration in the pipe to be coated below 5% by volume, it was necessary to increase the amount of the carrier gas. Although it is theoretically possible to lower the powder concentration by reducing greatly the rotation number of the motor, it was found that in such case the resin flow became a pulsating flow and no uniform flow could be obtained. Accordingly, in order to obtain a uniform flow of the powdery resin, it was necessary to maintain the rotation number of the motor above a certain limit, and therefore, it was inevitably necessary to increase the amount of the carrier gas with the result that the flow rate of the powder in the pipe to be coated was inevitably heightened. Accordingly, if the pipe preheating temperature was low, melt-coating of the powdery resin on the pipe wall became difficult, and hence, the pipe to be coated should inevitably be preheated at a temperature higher by at least 70°C. than the softening or melting point of the powdery resin. In view of the foregoing, the inner face coating was conducted under the following conditions:

Powder concentration in fluidized bed in hopper: 15.2% by volume

Power concentration in pipe to be coated: 1.0% by volume

Pipe preheating temperature: 200°C.

Powder feed rate: 18 m/sec.

Coating time: 20 seconds

Air-blowing rate in pipe after coating operation: 18 m/sec.

The so inner face-coated pipe was placed in a heating furnace and heated at 220°C. for 20 minutes to completely cure the inner face coating. In the resulting inner face coating, the thickness was quite non-uniform in the peripheral direction. Namely, the thickness varied from 200 to 600 $\mu$ on the inlet side and from 50 to 500$\mu$ on the outlet side. Thus, the thickness differed greatly between the upper side and lower side. Especially on the outlet side, the resin adhering state was extremely poor, and the surface exhibited a very rough orange peel appearance and formation of a great number of pin holes was observed in the thin thickness portion.

Causes of occurrence of these undesired phenomena are now considered.

Since the powdery resin concentration was low in the pipe to be coated, the degree of the contact with the powdery resin differed greatly between the upper face portion and lower face portion in the interior of the tube. Namely, the degree of the contact with the powdery resin was much lower in the upper face portion than in the lower face portion, and hence, the coating thickness differed greatly between the upper face portion and lower face portion in the interior of the pipe. The cause of formation of the orange peel on the outlet side is next considered. Since the pipe preheating temperature was considerably high, the temperature of the powdery resin introduced from the inlet side in the fluidized state was rather elevated when it came close to the outlet of the pipe. Once such heated powdery resin had contact with the pipe wall, it was immediately molten and the viscosity was lowered in a very short time. The so molten resin acted as a sticking agent and subsequent resin particles were fixed on the molten resin. This phenomenon was repeated, resulting in partial growth of coating. In this manner, convex portions were formed here and there on the pipe wall, and the resin flow was obstructed by such convex portions to form dead spaces downstream of the convex portions. With the growth of the convex portions, sticking of the resin particles on the dead spaces was further inhibited, with the result that extreme irregularities were brought about on the pipe face and pin holes were formed in such dead spaces where no resin particles were present.

In view of the foregoing experimental results, it will readily be understood that it is very important to maintain in a pipe to be coated such a high resin powder concentration as 5 to 40% by volume.

What we claim is:

1. A method for coating the inner faces of small diameter metal pipes which comprises feeding under pressure a stream of an air or inert gas-diluted powdery mixture composed of 20 to 90 parts by weight of a powdery resin having an average particle size of 5 to 100$\mu$ and 80 to 10 parts by weight of a carrier having a melting point at least as high as the melting point of said powdery resin and having an average particle size of 150$\mu$ to 5 mm and from 5 to 100 times greater than the average particle size of the powdery resin, said carrier forming substantially no part of said coating, through the interior of the metal pipe preheated to a temperature 20° to 70°C higher than the melting point of said powdery resin, at a rate of from 2 to 10 m/sec, so that the powdery mixture concentration is 5 to 40% by volume throughout the coating operation.

2. The method according to claim 1 wherein the metal pipe is in a horizontal position.

3. The method according to claim 1 wherein the powdery resin is at least one member selected from the group consisting of epoxy resins, polyester resins, acrylic resins, vinyl resins, polyamide resins, cellulose resins, polyolefin resins, fluorine resins and chlorinated polyether resins.

4. The method according to claim 1 wherein the carrier is at least one member selected from the group consisting of resin particles, foamed resin particles, microballoons, porous particles and glass beads.

* * * * *